July 19, 1955  J. K. BLUM ET AL  2,713,398
FLY-ASH SCREEN TRAP FOR INCINERATORS
Filed Dec. 10, 1953

INVENTORS
JOSEPH K. BLUM
ROGER G. BLUM
DONALD J. BLUM
BY
Mock + Blum
ATTORNEYS

United States Patent Office 2,713,398
Patented July 19, 1955

2,713,398

FLY-ASH SCREEN TRAP FOR INCINERATORS

Joseph K. Blum, Westchester County, Roger G. Blum, New York, and Donald J. Blum, Scarsdale, N. Y.

Application December 10, 1953, Serial No. 397,421

5 Claims. (Cl. 183—68)

The present invention relates to improvements in smoke filtering devices and in particular, to a trap for removing flyash and other debris from smoke leaving a chimney. The invention has particular application to the chimney of an incinerator flue.

One of the problems in the use of incinerator installations in multiple dwellings located in populated areas is the escape of flyash, sparks and other solid matter from the mouth of the incinerator chimney. Such solid matter is carried upwardly by the draft of the incinerator flue, and is ejected from the chimney mouth with sufficient force to scatter it over the surrounding area. The conventional manner of solving this problem has been to attach a flat screen across the mouth of the chimney. Serious difficulty in the use of such flat screen is the clogging of the incinerator flue when newspapers and other large pieces of debris carried upwardly by the draft become lodged against the flat screen. Such clogging of the screen interferes with the draft in the flue, causing smoke to escape through the feeding doors within the building.

It is an object of the present invention to provide an improved screen trap device constructed in such a manner as to cause sparks, flyash and other matter to travel in an unobstructed arcuate path from the chimney mouth directly into a collection box in which they are trapped.

Another object of the invention is to provide a screen trap device of the type described in which the force of the draft in the flue is utilized to separate centrifugally the solid particles from the smoke and gases leaving the chimney mouth.

Still another object of the invention is to provide a screen trap device of the type described which is effective for preventing the escape of small solid particles, while at the same time being virtually clog-proof when large particles are discharged from the chimney mouth.

A further object of the invention is the provision of a screen trap device of the type described in which large open mesh screening may be utilized in order to prevent interference with the draft within the flue.

Other objects and advantages of the invention will become readily apparent in the course of the following specification when taken in connection with the accompanying drawings, in which.

Figure 2:
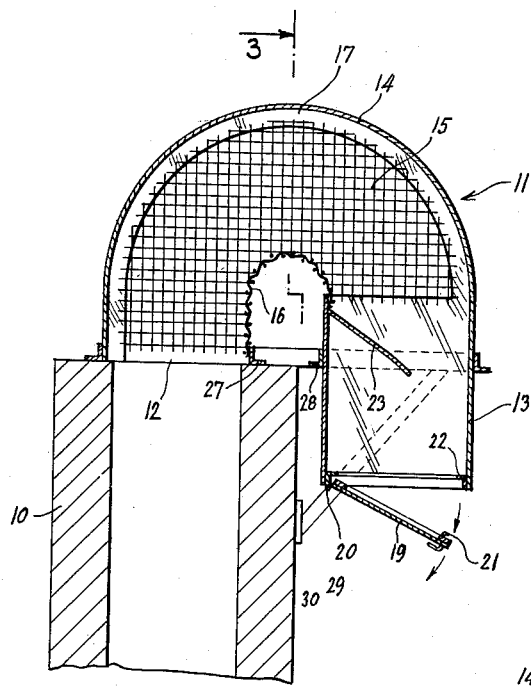
Fig. 2 is a vertical section through the screen trap device and chimney, showing the door of the collection box in a partially open position.
Figure 3:
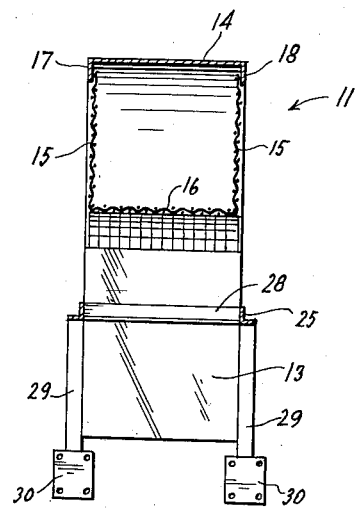
Fig. 3 is a section along line 3—3 of Fig. 2.
Figure 1:
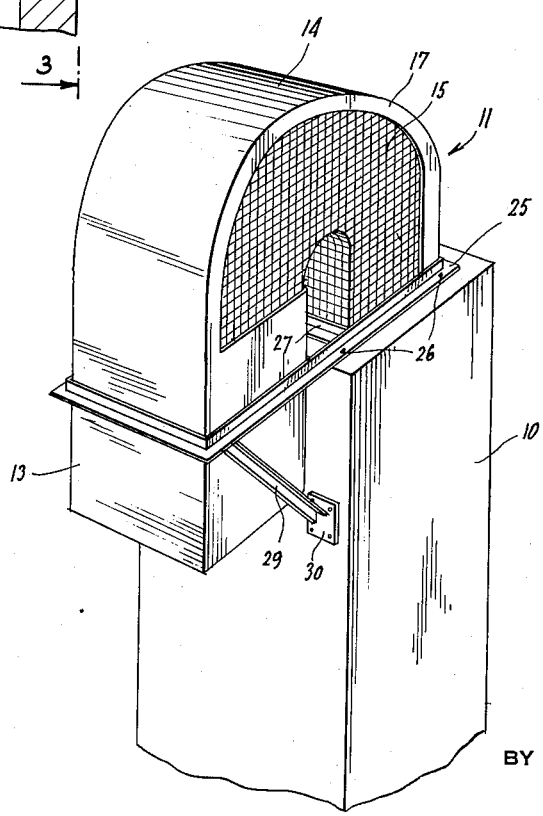
Fig. 1 is a perspective view of the screen trap device shown mounted on a chimney.

The drawings show a chimney 10 which may be the chimney communicating with the flue of an incinerator, and a screen trap device secured thereto. The screen trap device generally comprises a hollow duct 11 of inverted U-shape having an open end 12, and communicating with a closed collection box 13 on its other end. The duct 11 is preferably rectangular or square in cross-section and has an outer wall 14 formed of a single sheet of solid metallic material of arcuate shape which extends from the open end 12 to the collection box 13 and is preferably integral with said collection box. The side wall 15 and the inner wall 16 of the duct 11 are formed of metallic wire screen which is preferably of large mesh.

The arcuate outer wall 14 has terminal depending, integral flanges 17 and 18 which are attached to the outer upper edges of the screened side walls 15, and form the upper portions of said side walls. The collection box 13 is preferably rectangular as shown, and may be made of any suitable size, although its top open end, which communicates with the interior of the duct 11, should be substantially the same cross-sectional shape and area as the duct. The bottom of said box 13 is closed normally by an access door 19 which is attached at one end to the box 13 by a hinge 20. The other end of the door 19 has a latch 21 cooperating with a flange 22 of the box 13 for releasably holding the door 19 in a closed position. The collection box 13 also contains a downwardly inclined baffle plate 23 which ends the width of the box 13. This baffle plate 23 is secured at one end to the upper sheet of the inner wall of box 13 and extends toward the outer wall of box 13 which coincides with the outer wall 14 of the duct. In its preferred form, the baffle plate 23 extends slightly past the center of box 13.

The screen trap is bordered by a rectangular frame 25 which is formed of angle irons. The frame 25 extends around the open end or mouth 12 of the duct 11 and also extends around an intermediate portion of the collection box 13, being secured to the duct and the collection box by welding, riveting or the like. The portion of frame 25 adjacent the open end of the duct overlies the top surface of the chimney 10 and is rigidly secured thereto as by bolts 26 in such a manner that the open duct end 12 communicates with the mouth of said chimney. As an additional support, transverse angle irons 27 and 28 may extend between the arms of the frame 25 to embrace the inner surfaces of the collection box 13 and the duct 11. In order to support the weight of the collection box 13 a pair of braces 29 also formed of angle irons, are secured to the under-surface of a portion of frame 25 surrounding said box, and extend angularly to anchor plates 30 bolted flush against the side of the chimney.

In operation of the device, hot gases, smoke, sparks and solid particles ascend the incinerator flue by virtue of the draft therein and are ejected through the mouth of the chimney 10 with considerable force. Since the gases and smoke have substantially no mass, they expand upon leaving the mouth of the chimney and escape readily through the large screen openings of the duct side walls and end walls 15 and 16. A stream of gases will, however, travel through the arcuate path provided by the U-shaped conduit 11. Since the solid particles have a greater weight than the gases, they will be thrust outwardly by centrifugal force and will impinge upon the solid arcuate end wall 14 of the duct 11, travelling along the entire length of said wall 14 directly into the collection box 13. The depending flanges 17, 18 of the top wall 14 confine these particles in their travel and prevent the particles from being thrown laterally through the screened side walls 15. In addition, the flanges 17, 18 prevent large particles from becoming clogged in the screened side walls 15, which would be the case if the screening of said side walls extended entirely up to the top wall 14. This arrangement is particularly advantageous when sheets of newspapers or other large particles are ejected from the chimney mouth, the large particles being carried along the solid sheet metal wall 14, guided by the flanges 17, 18, and do not clog the screening.

The arrangement of the baffle plate 23 in the collection box 13 is such as to prevent eddy currents which may form in the collection box from causing scattering of the refuse already collected in the box 13 and its escape from said box.

It will be noted that three sides of the duct adjacent the mouth of the chimney 10 are formed of large mesh screening so that the mounted screen trap device does not interfere with the normal draft of incinerator flue.

While a preferred embodiment of the invention has been disclosed herein, it is obvious that numerous changes, omissions and additions may be made in the invention without departing from the spirit and scope thereof.

What is claimed is:

1. A screen trap device for mounting on the top of an incinerator chimney and to serve as a continuation of said chimney, said device comprising a conduit of inverted U-shape having an open end, a solid-walled collection box fixed to and closing off the opposite end of said conduit, said conduit having a top outer wall of smooth, flat sheet material bent into arcuate shape and extending from the open end of said conduit to said collection box, said outer wall also having depending terminal flanges of solid sheet material extending continuously along each of its side edges and forming the upper side wall portions of said conduit, sheets of wire screening forming the lower side wall portions and the inner walls of said conduit, and means to mount the device at the top of said chimney with the open end of said conduit in communication with the mouth of the chimney, the inner cross-sectional area of the conduit being substantially equal to the inner cross-sectional area of the chimney and being uniform along its entire length.

2. A screen trap device according to claim 1, in which the collection box mouth is of the same shape and at least as large in cross-sectional area as the conduit.

3. A screen trap device according to claim 1, in which the collection box has an internally-mounted baffle plate secured to one of the walls thereof and inclined downwardly toward the opposite side.

4. A screen trap device for mounting on the top of an incinerator chimney as a continuation of the chimney and for separating and collecting solid particles from gases escaping from the chimney, said device comprising a conduit of inverted U-shape having an open end, a solid-walled collection box for receiving said solid particles fixed to and closing off the opposite end of said conduit, said conduit having an arcuate top outer wall of solid sheet material extending from the open end of said conduit to said collection box, said outer wall having depending terminal flanges of solid sheet material extending the length of each of its side edges and forming the upper side wall portions of said conduit, sheets of wire screening forming the lower side wall portions and the inner walls of said conduit, and means for mounting said screen trap device on said chimney with the open end of said conduit in communication with the mouth of said chimney, the screen trap device in mounted position extending above and to one side of the chimney and being unobstructed to prevent interference with the draft in said chimney.

5. A screen trap device according to claim 4 in which the collection box extends parallel to and on one side of the chimney, the mounting means comprising a frame extending around and joining the open end of said conduit and said collection box, the frame portion adjacent said collection box being mounted flush against the upper surface of said chimney and holding the open end of said conduit flush against said chimney mouth.

References Cited in the file of this patent

UNITED STATES PATENTS

| | | |
|---|---|---|
| 4,048 | Sweet, Jr. | May 13, 1845 |
| 4,715 | Sweet, Jr. | Aug. 26, 1846 |
| 5,422 | Lafitte | Feb. 1, 1848 |
| 1,270,147 | Gollinge | June 18, 1918 |